(12) United States Patent
Racine

(10) Patent No.: US 8,825,303 B1
(45) Date of Patent: Sep. 2, 2014

(54) WHEEL ALIGNMENT APPARATUS AND METHOD FOR VEHICLES HAVING ELECTRO-MECHANICAL POWER STEERING

(71) Applicant: Snap-On Incorporated, Conway, AR (US)

(72) Inventor: Ronald Racine, Conway, AR (US)

(73) Assignee: Snap-On Incorporated, Conway, AR (US)

( * ) Notice: Subject to any disclaimer, the term of this patent is extended or adjusted under 35 U.S.C. 154(b) by 0 days.

(21) Appl. No.: 13/852,584

(22) Filed: Mar. 28, 2013

(51) Int. Cl.
*A01B 69/00* (2006.01)

(52) U.S. Cl.
USPC ............................................ 701/42

(58) Field of Classification Search
None
See application file for complete search history.

(56) References Cited

U.S. PATENT DOCUMENTS

| | | | |
|---|---|---|---|
| 8,364,350 B2 * | 1/2013 | Yanagi et al. ............... | 701/42 |
| 2005/0206226 A1 * | 9/2005 | Lu et al. ..................... | 303/20 |
| 2005/0206229 A1 * | 9/2005 | Lu et al. ..................... | 303/123 |
| 2010/0332083 A1 * | 12/2010 | Yanagi et al. ............... | 701/42 |

* cited by examiner

*Primary Examiner* — Thomas Tarcza
*Assistant Examiner* — Adam Alharbi
(74) *Attorney, Agent, or Firm* — McDermott Will & Emery LLP

(57) ABSTRACT

A method and apparatus are provided for aligning the wheels of a vehicle equipped with an electro-mechanical power steering system having a steering angle sensor, a torque sensor, and a torsion bar linking the steering angle sensor and the torque sensor. Embodiments include moving a steering wheel of the vehicle to a level position such that there is substantially no torque applied to the torsion bar; adjusting the toe of a first one of the front wheels of the vehicle after the steering wheel is moved to the level position; and moving the steering wheel substantially back to the level position, then re-adjusting the toe of the first one of the front wheels, when the steering wheel has moved more than a predetermined angle from the level position while adjusting the toe of the first one of the front wheels.

14 Claims, 10 Drawing Sheets

WHEEL ALIGNMENT APPARATUS AND METHOD FOR VEHICLES HAVING ELECTRO-MECHANICAL POWER STEERING

TECHNICAL FIELD

The present subject matter relates to vehicle wheel alignment. The present subject matter has particular applicability to wheel alignment for vehicles equipped with electro-mechanical power steering.

BACKGROUND

A current conventional vehicle wheel alignment system uses sensors or heads that are attached to the wheels of a vehicle to measure various angles of the wheels and suspension. These angles are communicated to a host system, where they are used in the calculation of vehicle alignment angles. In the standard conventional aligner configuration, four alignment heads are attached to the wheels of a vehicle, Each sensor head comprises two horizontal or toe measurement sensors and two vertical or camber/pitch sensors. Each sensor head also contains electronics to support overall sensor data acquisition as well as communications with the aligner console, local user input, and local display for status feedback, diagnostics and calibration support.

In recent years, wheels of motor vehicles have been aligned in some shops using a computer-aided, three-dimensional (3D) machine vision alignment system. In such a system, one or more cameras view targets attached to the wheels of the vehicle, and a computer in the alignment system analyzes the images of the targets to determine wheel position and alignment of the vehicle wheels from the wheel position data. The computer typically guides an operator to properly adjust the wheels for precise alignment, based on calculations obtained from processing of the image data. A wheel alignment system or aligner of this image processing type is sometimes called a "3D aligner." Examples of methods and apparatus involving computerized image processing for alignment of motor vehicles are described in U.S. Pat. No. 5,943,783 entitled "Method and apparatus for determining the alignment of motor vehicle wheels;" U.S. Pat. No. 5,809,658 entitled "Method and apparatus for calibrating cameras used in the alignment of motor vehicle wheels;" U.S. Pat. No. 5,724,743 entitled "Method and apparatus for determining the alignment of motor vehicle wheels;" and U.S. Pat. No. 5,535,522 entitled "Method and apparatus for determining the alignment of motor vehicle wheels." A wheel alignment system of the type described in these references is sometimes called a "3D aligner" or "visual aligner." An example of a commercial vehicle wheel aligner is the Visualiner 3D, commercially available from John Bean Company of Conway, Ark., a unit of Snap-on Inc.

Alternatively, a so-called "hybrid" machine vision wheel alignment system may include a pair of passive heads and a pair of active sensing heads. The passive heads are for mounting on a first pair of wheels of a vehicle to be measured, and the active sensing heads are for mounting on a second pair of wheels of the vehicle. Each passive head includes a target, and each active sensing head includes gravity gauges for measuring caster and camber, and an image sensor for producing image data, including an image of a target of one of the passive heads, when the various heads are mounted on the respective wheels of the vehicle. The system also includes a spatial relationship sensor associated with at least one of the active sensing heads, to enable measurement of the spatial relationship between the active sensing heads when the active sensing heads are mounted on wheels of the vehicle. The system further includes a computer for processing the image data relating to observation of the targets, as well as positional data from the spatial relationship sensor, for computation of at least one measurement of the vehicle.

Conventional methods of adjusting the individual toe angles of the front wheels of a vehicle require leveling and locking the vehicle's steering wheel. This method applies to hydro-mechanical power steering systems which do not have electronic sensors mounted on the steering column, as well as "servotronic" types of systems. Such hydro-mechanical power steering systems depend on hydraulic fluid pressure to provide steering assist, typically provided by an engine-driven hydraulic pump.

Many newer vehicles are equipped with electro-mechanical power steering (EPS) systems which use an electric motor to provide steering assist. The electric motor is controlled by an electronic control module (ECM), which receives signals from electronic sensors such as a steering wheel angle sensor, a torque sensor, a summation sensor, and a vehicle speed sensor. A typical EPS system has a torque sensor, torsion bar, and steering angle sensor mounted on the steering column and/or steering gear to track the position of the steering wheel and allow the ECM to respond to a torque request for power assist.

Unlike hydro-mechanical systems, EPS systems are sensitive to steering rack movement during alignment adjustment. Any movement in the steering rack imposes rotation on the steering shaft, rotating the steering angle sensor. If the steering wheel is held in place at a level position using a steering wheel holder (as in conventional alignment procedures), the torque sensor cannot respond to the imposed rack movement. Consequently, a lack of synchronization or "delta" is created between the steering angle sensor and torque sensor. The delta is unknown to the alignment technician. However, the ECM will recognize this delta and interpret it as a request for torque assist (i.e., power steering) and will send a command to the electric motor to provide power assist that will steer the vehicle, resulting in the driver of the vehicle disadvantageously perceiving a "pull" normally associated with improper wheel alignment.

There exists a need for an alignment apparatus and method for EPS-equipped vehicles that does not result in a lack of synchronization between EPS sensors, and thus does not require re-synchronization of the sensors after alignment.

SUMMARY

The teachings herein improve over conventional alignment techniques for EPS-equipped vehicles by providing an apparatus and method that does not require the steering wheel to be locked to align the front wheels.

According to the present disclosure, the foregoing and other advantages are achieved in part by a method for aligning the wheels of a vehicle equipped with an electro-mechanical power steering system having a steering angle sensor, a torque sensor, and a torsion bar linking the steering angle sensor and the torque sensor. The method comprises moving a steering wheel of the vehicle to a level position such that there is substantially no torque applied to the torsion bar; adjusting the toe of a first one of the front wheels of the vehicle after the steering wheel is moved to the level position; and moving the steering wheel substantially back to the level position, then re-adjusting the toe of the first one of the front wheels, when the steering wheel has moved more than a predetermined angle from the level position while adjusting the toe of the first one of the front wheels.

In accord with another aspect of the disclosure, an apparatus for aligning the wheels of a vehicle equipped with an electro-mechanical power steering system comprises measuring devices for determining toe angles for each of the front and rear wheels of the vehicle, and a data processor coupled to the measuring devices. The data processor has a set of instructions that, when executed, cause the data processor to perform the steps of: calculating a thrust angle of the rear wheels based on the toe angles of the rear wheels received from the measuring devices; prompting a technician to move a steering wheel of the vehicle to a level position without locking the steering wheel; establishing the level position of the steering wheel based on each of the front wheel toe angles, received from the measuring devices, relative to the thrust angle; prompting a technician to adjust the toe of a first one of the front wheels of the vehicle; determining whether the steering wheel has moved more than a predetermined angle from the level position while adjusting the toe of the first one of the front wheels based on a change in the toe angle of a second one of the front wheels; prompting the technician to move the steering wheel substantially back to the level position, then re-adjust the toe of the first one of the front wheels, when the steering wheel has moved more than the predetermined angle from the level position while adjusting the toe of the first one of the front wheels; and determining whether the steering wheel has moved more than the predetermined angle from the level position while re-adjusting the toe of the first one of the front wheels based on a change in the toe angle of the second one of the front wheels.

Additional advantages and novel features will be set forth in part in the description which follows and in part will become apparent to those having ordinary skill in the art upon examination of the following and the accompanying drawings or may be learned from production or operation of the examples. The advantages of the present teachings may be realized and attained by practice or use of the methodologies, instrumentalities and combinations particularly pointed out in the appended claims.

BRIEF DESCRIPTION OF THE DRAWINGS

Reference is made to the attached drawings, wherein elements having the same reference numeral designations represent like elements throughout, and wherein.

DETAILED DESCRIPTION

According to the disclosed system and methodology, a vehicle's rear wheels are aligned first, the thrust angle of the rear wheels is calculated, and the caster and camber of the front wheels is adjusted using a conventional alignment system, such as an imaging aligner using targets on the wheels, as discussed herein above. The steering wheel is then leveled using the vehicle's EPS system (i.e., with the engine running), and the individual toe of the right and left front wheels is sequentially adjusted.

During front wheel toe adjustment, the steering wheel level is monitored using a graphically displayed steering wheel level gauge generated based on the individual toe angles relative to the thrust angle. If the steering wheel level moves more than a predetermined angle after the toe of one of the wheels is adjusted, the steering wheel is reset to the level position and the toe for that wheel is re-adjusted as necessary before proceeding. The toe adjustment is completed when the steering wheel is level and the toe for both wheels is within specifications.

The disclosed system and method enables front wheel toe to be adjusted without locking the steering wheel. Consequently, the sensors of the EPS system are not loaded during the toe adjustment, and so do not need to be reset after the wheel alignment.

Figure 1A:
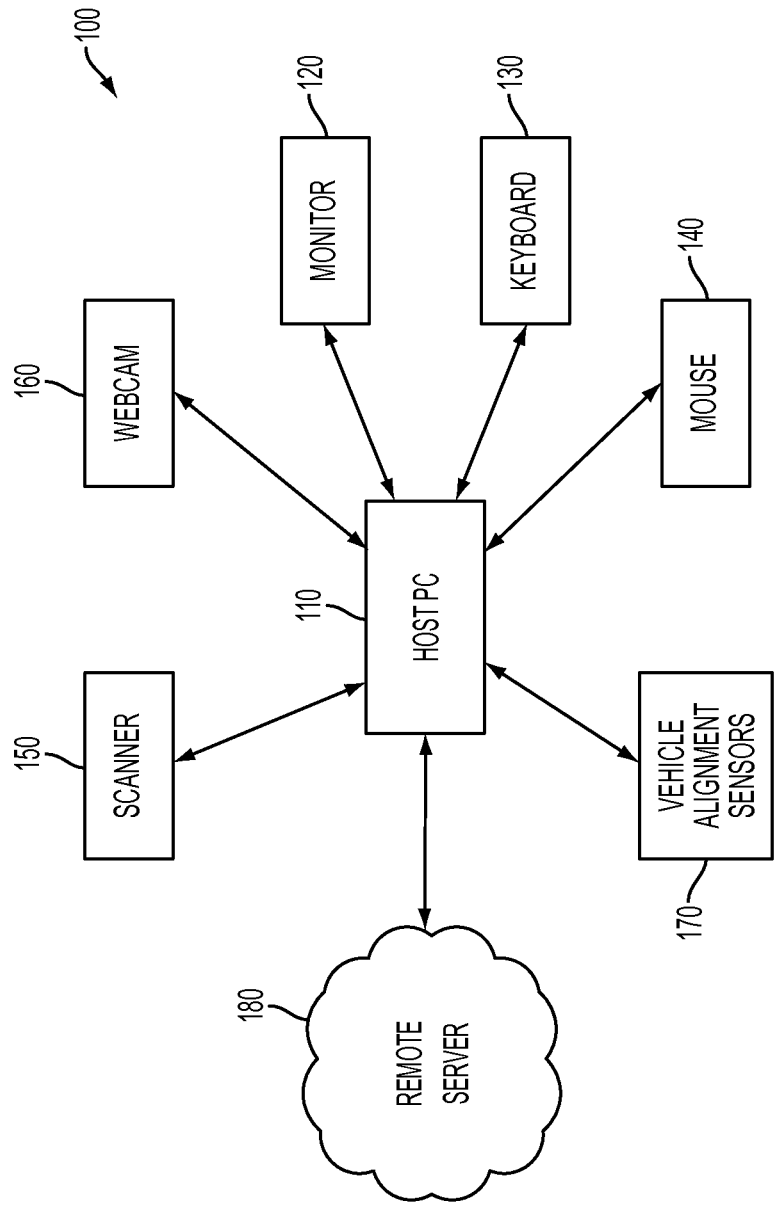
FIG. 1a depicts an exemplary architecture of a system in which the disclosed methodology and graphical user interface are implemented.

FIG. 1a is an exemplary architecture of a system 100 that is an environment for implementing the functionality and user interface of the present disclosure. In system 100, a host computer, such as a commercially available personal computer (PC) 110, is connected to conventional input and output devices such as monitor 120, keyboard 130, mouse 140, scanner 150, and webcam 160. Monitor 120 is a conventional monitor, or a conventional touch screen for accepting user input. PC 110 is further connected to vehicle alignment sensors 170 of a vehicle wheel alignment system as discussed in the "Background" section herein above. A conventional remote server 180 is also connected to host PC 110. Server 180 provides content from various databases described herein to PC 110. Such content is either stored at server 180, or obtained via the Internet or another remote data network. PC 110 can also send data to server 180; for example, to update certain databases stored at server 180. Those of skill in the art will understand that the functionality and user interface of this disclosure can be implemented in software in a conventional manner, such as by modifying the software of a machine vision alignment system described in the Background section above.

Figure 1B:
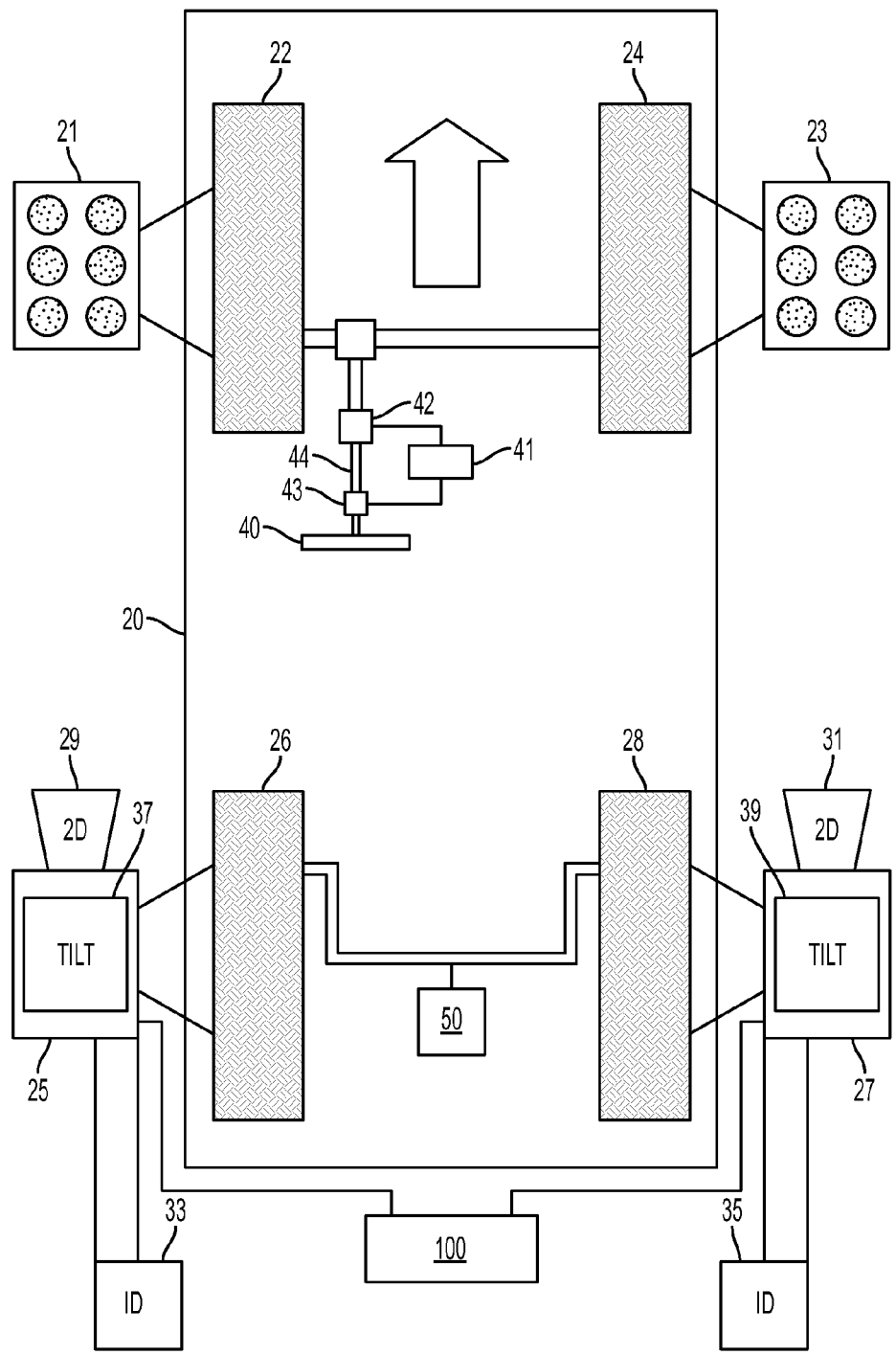
FIG. 1b schematically depicts a vehicle to be aligned using the disclosed method and apparatus.

FIG. 1b is a schematic view of a vehicle 20 to be aligned using the disclosed methodology and apparatus. The vehicle 20 has a pair of front wheels 22, 24 and a pair of rear wheels 26, 28, and an EPS system including a steering column with a steering wheel 40, an electronic control unit (ECU) 41 in communication with a steering angle sensor 42 and a torque sensor 43, and a torsion bar 44 between the steering angle sensor 42 and the torque sensor 43. The vehicle 20 is also equipped with rear-wheel steering, and so has an electronic control unit 50 for controlling a rear suspension component. The disclosed method and apparatus is incorporated into an exemplary hybrid-type aligner having a pair of passive targets 21, 23 mounted to front wheels 22, 24; and a pair of active sensing heads 25, 27 mounted to rear wheels 26, 28. Each of the heads 25, 27 has a camera 29, 31, a spatial relationship sensor 33, 35, and a tilt sensor 37, 39. A computer system, such as system 100 of FIG. 1a, is attached to sensing heads 25, 27 to implement the functionality and user interface of the present disclosure, and performs other wheel alignment calculations in a well-known manner.

Figure 2A:
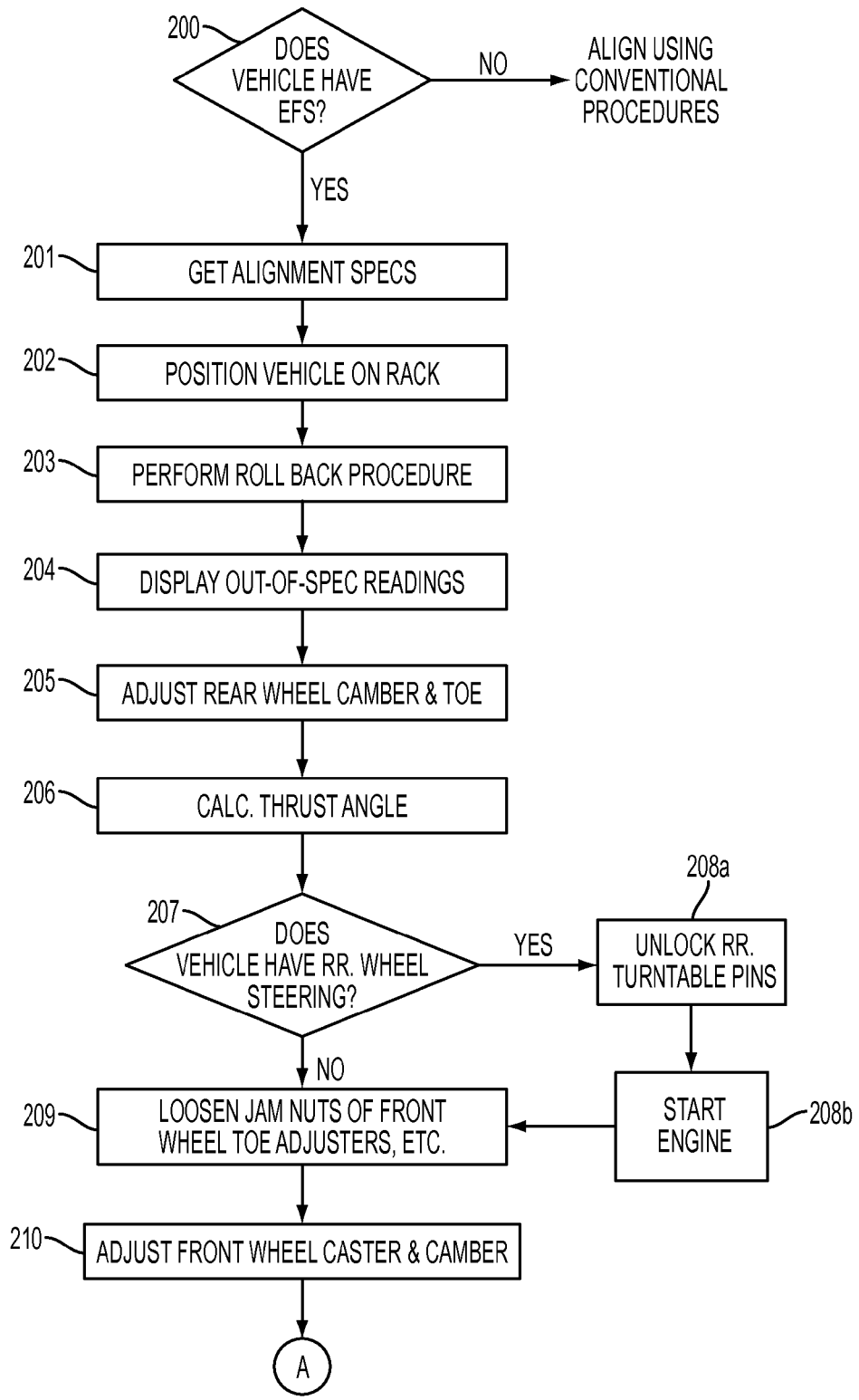
FIGS. 2a and 2b are flow charts of an exemplary process for implementing the methodology of the present disclosure.

The disclosed methodology will now be described with reference to the flow charts of FIG. 2a-b. The steps of the flow charts wherein the technician is prompted to perform a task, the steps of monitoring the condition of the vehicle steering wheel or road wheels, and the calculating steps are performed by a data processor such as system 100 of the disclosed apparatus. The data processor has a set of appropriate instructions in the form of hardware or software contained on a tangible medium.

First, at step 200, it is determined whether the vehicle is equipped with EPS. This can be accomplished by, for example, the technician scanning or manually entering the vehicle's VIN (vehicle identification number) into the alignment system or some other system having access to a database with vehicle manufacturer's information and/or vehicle alignment specifications. Alternatively, the technician can determine whether the vehicle has EPS by inspecting its steering column for EPS sensors. If it is determined the vehicle is not equipped with EPS, the wheels are aligned per conventional procedures. If equipped with EPS, the technician aligns the rear wheels first, then the front wheels as detailed below.

For an EPS-equipped vehicle, the technician retrieves the vehicle's alignment specifications from the alignment machine's database (step 201), positions the vehicle on an alignment rack (step 202), such as a rack having a conventional locking turntable under each of the wheels, and mounts the targets or alignment heads on the wheels. A conventional roll back procedure is then performed (step 203), and the vehicle's wheel alignment specifications are compared to the actual readings. Actual readings that do not meet the specifications are indicated (e.g., colored in red) in the aligner's display at step 204.

The wheel alignment adjustment sequence now begins. The technician adjusts the individual rear wheel camber angles and toe angles first (step 205), and the thrust angle of the rear wheels is determined by the aligner in a well-known manner based on the measured toe angles of the rear wheels (step 206). Some vehicles are equipped with electronically-controlled rear wheel steering or dynamic body control (e.g., automatically adjustable sway bars) which may cause the thrust angle to change. When aligning vehicles so equipped (step 207), the pins of the turntables under the rear wheels must be removed after performing the roll back procedure to unlock the turntables (step 208a); and typically the engine of the vehicle must subsequently be started (step 208b), to reset the rear wheel steering (or dynamic body control) electronic control unit.

At step 209, the technician is prompted to loosen the jam nuts or radial clips on the vehicle's front wheel toe adjusters, ensure the toe adjusters can rotate freely, and ensure that the turntable and rear slip plate pins have been removed. Next, at step 210, the system prompts the technician to measure front wheel caster and camber, and to adjust these as necessary.

Figure 2B:
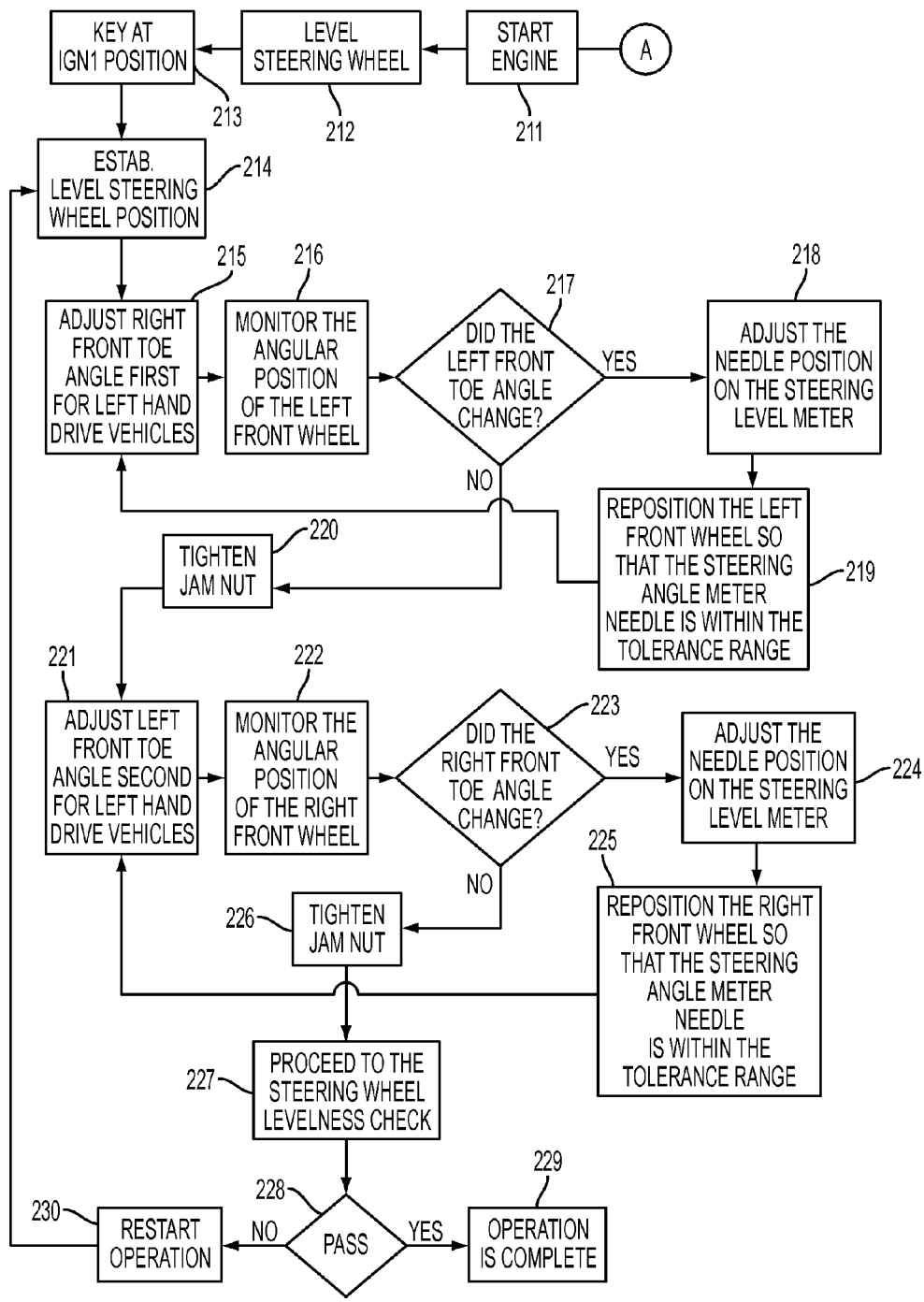

Referring now to FIG. 2b, the technician is then prompted to start the vehicle's engine to activate the electro-mechanical power steering system (step 211), and move a steering wheel of the vehicle to a level position without locking the steering wheel (step 212). The engine is then turned off and the vehicle is placed in service mode (e.g., the ignition switch left in "IGN1" position for vehicles using a blade-type ignition key) such that the EPS electronic controller remains powered on (step 213). The technician is also prompted to install a battery maintainer/charger.

The EPS controller must be powered on during the EPS alignment procedure because in typical EPS systems, the steering angle sensor reports the current steering wheel angle position to the EPS controller even when the engine is off and the vehicle is stationary. This feature is designed to reduce sudden activation of the steering wheel upon start-up if a delta exists between the steering angle sensor and torque sensor. Since most EPS systems are speed and torque sensitive, at lower vehicle speeds more energy is required to steer the front wheels. Therefore, more power is directed to the EPS servo electric motor by the EPS controller. Having the controller powered on by leaving the ignition switch in the "IGN1" position during the alignment procedure enables the controller to compare the steering angle sensor's relative position to the torque sensor's relative position.

Leaving the ignition switch in the "IGN1" position also allows the steering column, on which the steering angle sensor and torque sensor are mounted, to orbit freely about the steering wheel column axis. As discussed herein, during the front toe angle adjustments, the steering column of EPS-equipped vehicles must remain unlocked so rotational torque is not induced on the steering column. Such torque disadvantageously creates a delta between the steering angle sensor and the torque sensor, leading to a crooked steering wheel and the necessity to realign the wheels.

At step 214, the system establishes the level position of the steering wheel based on each of the front wheel toe angles, received from the measuring devices, relative to the thrust angle. That is, the system records the front wheel individual toe angles using the thrust angle as a reference, and the steering wheel level is established by the static relationship of the thrust angle and individual front wheel toe angles.

Figure 3A:
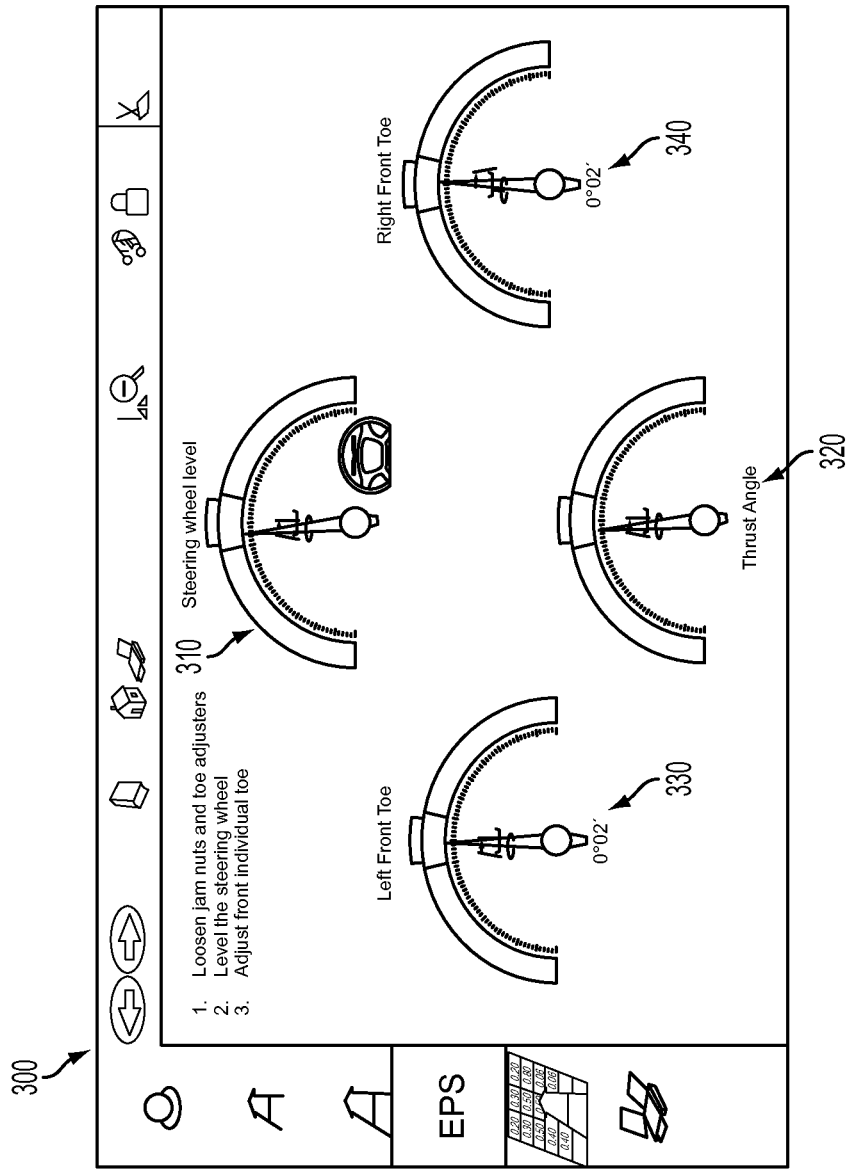
FIGS. 3a-3e are exemplary screen shots of a user interface according to embodiments of the present disclosure.

Referring now to FIG. 3a-e, the disclosed EPS alignment apparatus includes a graphical user interface that graphically displays a steering level indicator, a thrust angle indicator, and left and right front toe indicators for guiding the technician when aligning the wheels and leveling the steering wheel. FIG. 3a shows an exemplary display screen 300 with all four indicators: steering level indicator 310, thrust angle indicator 320, left front toe indicator 330, and right front toe indicator 340. The disclosed aligner display screen implements this functionality as follows, using a well-known software tool such as Visual Studio 2008, XAML, WPF, or C#. Other conventional toolkits (i.e., development environments) may be used to achieve similar effects.

Figure 3B:
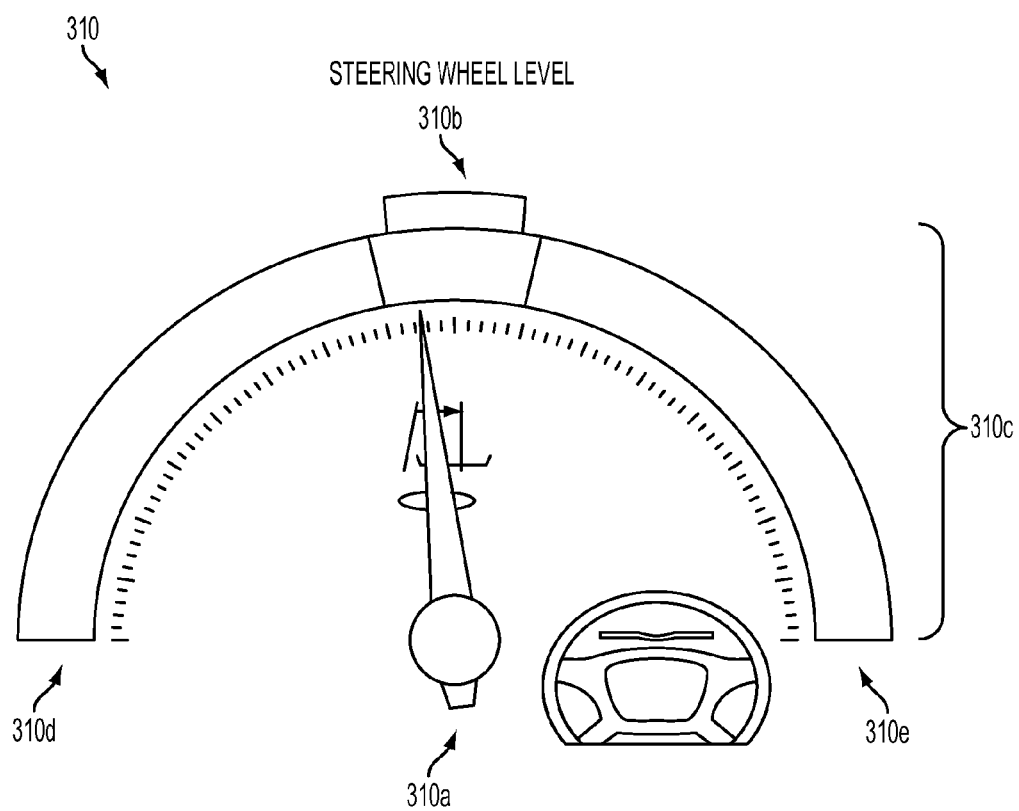

As shown in FIG. 3b, steering wheel level indicator 310 includes a needle 310a that can point to a level zone graphic 310b within a larger scale 310c when the steering wheel is within a predetermined range of degrees of a level position. The level zone 310b is shown in a contrasting color (i.e., green) or other graphic to distinguish it from the rest of the scale 310c, dividing the scale 310c into segments including a segment 310d indicating the steering wheel is crooked to the left, and a segment 310e indicating the steering wheel is crooked to the right.

The position of level steering wheel needle 310a is determined by the individual front wheel toe angles and the rear thrust angle, as discussed above. Additionally, a factor ratio is implemented to control the movement of the needle 310a. The ratio is an external reference, and is adjustable between 10/1 and 28/1; for example, a 12/1 ratio.

Figure 3C:
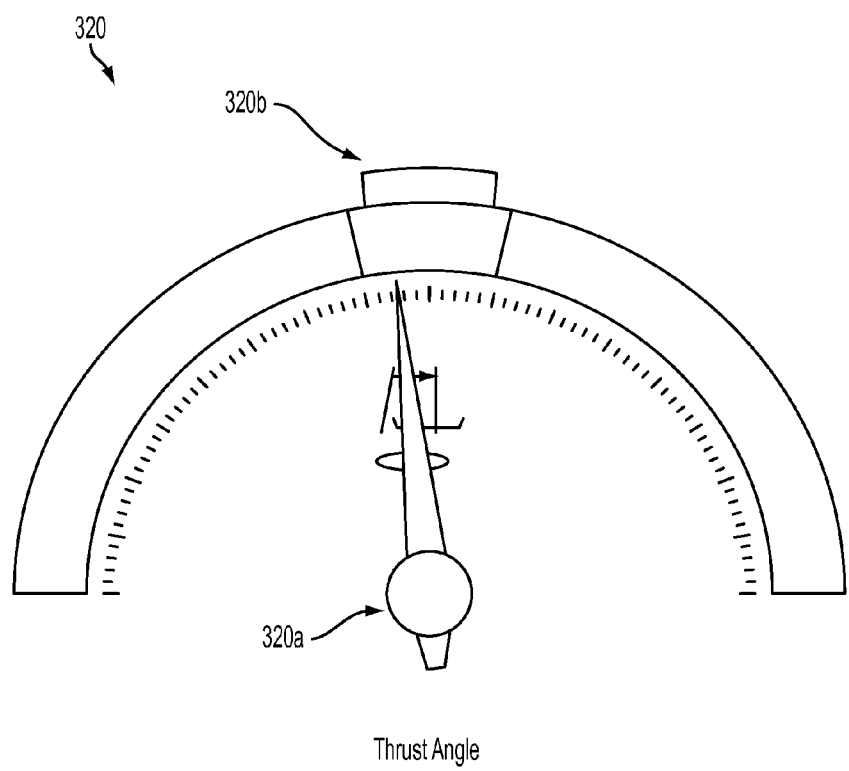

As shown in FIG. 3c, thrust angle meter 320 includes a needle 320a that can point to a zone 320b indicating a predetermined range of degrees from the previously set thrust angle. The thrust angle meter 320 allows monitoring of the position of the rear wheels. Should there be a change in the position of the rear wheels which can affect the final positions of the front wheels, the technician would be able to see it and correct it before finalizing the front wheel alignment.

Figure 3D:
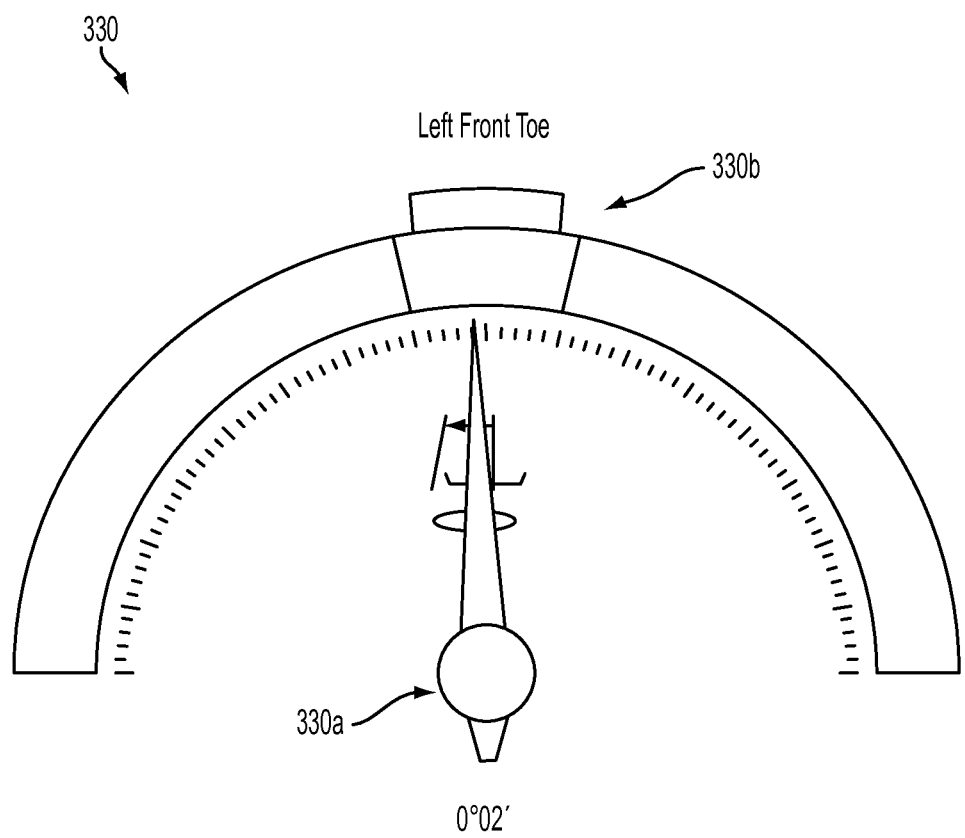
Figure 3E:
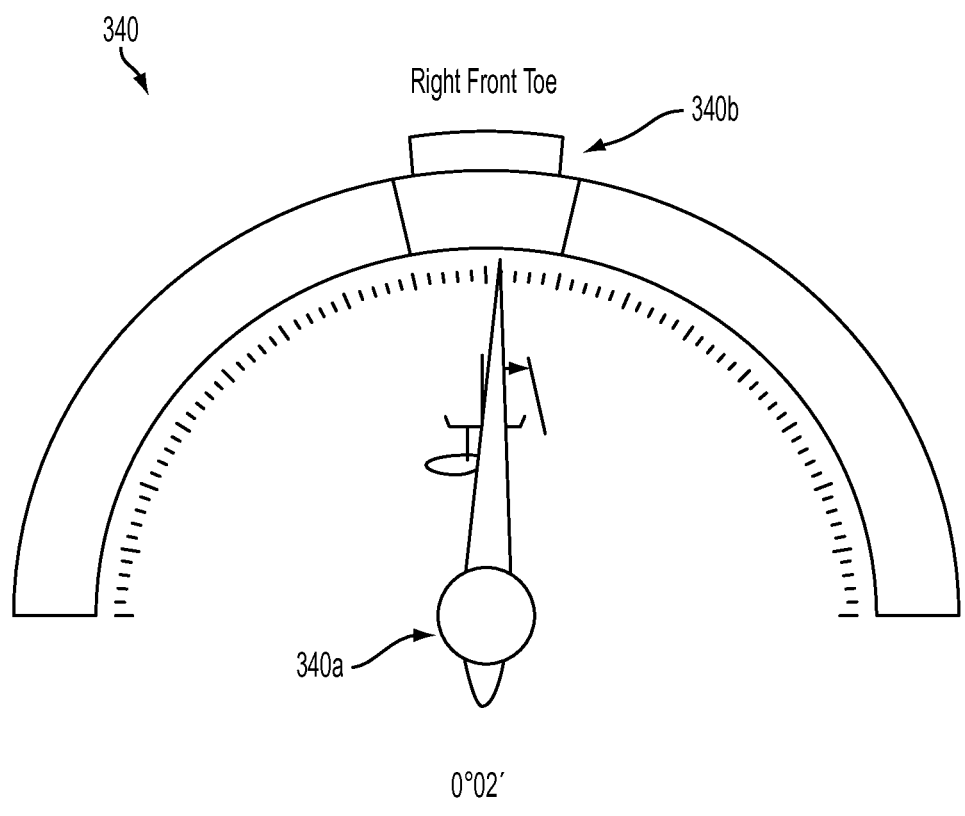

As shown in FIGS. 3d and 3e, left front toe meter 330 and right front toe meter 340 each respectively include a needle 330a, 340a that can point to a zone 330b, 340b indicating a predetermined range of degrees from a specified toe angle. The toe meters 330, 340 allow monitoring of the position of each of the front wheels as they are being adjusted.

Referring again to FIG. 2b, at step 215 the technician is next prompted to adjust the toe of a first one of the front wheels of the vehicle; for example, the right side front wheel toe angle for a left hand drive vehicle.

The data processor monitors the levelness of the steering wheel (step 216) by monitoring the value of the left front wheel individual toe angle, to determine whether the steering wheel has moved more than a predetermined angle from the level position. When adjusting the right wheel front toe angle, the adjuster (e.g., the tie rod) moves the wheel away or toward the steering rack. If the turntable's turnplate is frozen or difficult to move, the tie rod will move the rack instead of the wheel, resulting in undesired movement of the right wheel, causing the steering wheel to rotate in the direction of the rack movement.

If the left wheel toe value changes during adjustment of the right front toe angle (step 217), this would be shown by the needle 310a of steering wheel level indicator 310 and by the needle 330a of the left toe meter 330. If the steering wheel has moved more than the predetermined angle from the level position (step 218), the technician is prompted to reset the steering wheel level by moving the left front wheel at step 219, using the steering wheel level meter 310 as a guide. The technician is then prompted to re-adjust the right wheel toe (step 215).

The data processor then determines whether the steering wheel has moved more than the predetermined angle from the level position while re-adjusting the toe of the right front wheel, again based on a change in the toe angle of the left front wheel (steps 216-217). The alignment technician continues to adjust the right front toe angle (steps 215-219), using the steering wheel level meter 310 as a guide, until the adjustment meets the specification and the steering wheel is leveled. When the right front toe angle and the steering wheel level indicator are in the preferred adjustment area, the technician is prompted to tighten the jam nut on the tie rod at step 220.

At step 221, the technician is prompted to adjust the toe of the left front wheel. The data processor monitors the levelness of the steering wheel (step 222) by monitoring the value of the right front wheel individual toe angle, to determine whether the steering wheel has moved more than a predetermined angle from the level position. When adjusting the left wheel front toe angle, the adjuster (e.g., the tie rod) moves the wheel away or toward the steering rack. If the turntable's turnplate is frozen or difficult to move, the tie rod will move the rack instead of the wheel, resulting in undesired movement of the left wheel, causing the steering wheel to rotate in the direction of the rack movement.

If the right wheel toe value changes during adjustment of the left front toe angle (step 223), this would be shown by the needle 310a of steering wheel level indicator 310 and by the needle 340a of the right toe meter 340. If the steering wheel has moved more than the predetermined angle from the level position (step 224), the technician is prompted to reset the steering wheel level by moving the right front wheel at step 225, using the steering wheel level meter 310 as a guide. The technician is then prompted to re-adjust the left wheel toe (step 221).

The data processor then determines whether the steering wheel has moved more than the predetermined angle from the level position while re-adjusting the toe of the left front wheel, again based on a change in the toe angle of the right front wheel (steps 222-223). The alignment technician continues to adjust the left front toe angle (steps 221-225), using the steering wheel level meter 310 as a guide, until the adjustment meets the specification and the steering wheel is leveled. When the left front toe angle and the steering wheel level indicator are in the preferred adjustment area, the technician is prompted to tighten the jam nut on the tie rod at step 226.

At step 227, the steering wheel level is checked again, and if the level is within the acceptable range at step 228, as shown by steering wheel level indicator 310, the operation is complete (step 229). If not, the operation is restarted (step 230).

Thus, the disclosed system and method enables front wheel toe to be adjusted while the steering wheel is unlocked. Since the sensors of the EPS system are not loaded during the toe adjustment, they do not need to be reset after the wheel alignment thereby saving time and effort.

Computer hardware platforms may be used as the hardware platform(s) for one or more of the user interface elements described herein. The hardware elements, operating systems and programming languages of such computers are conventional in nature, and it is presumed that those skilled in the art are adequately familiar therewith to adapt those technologies to implement the graphical user interface essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
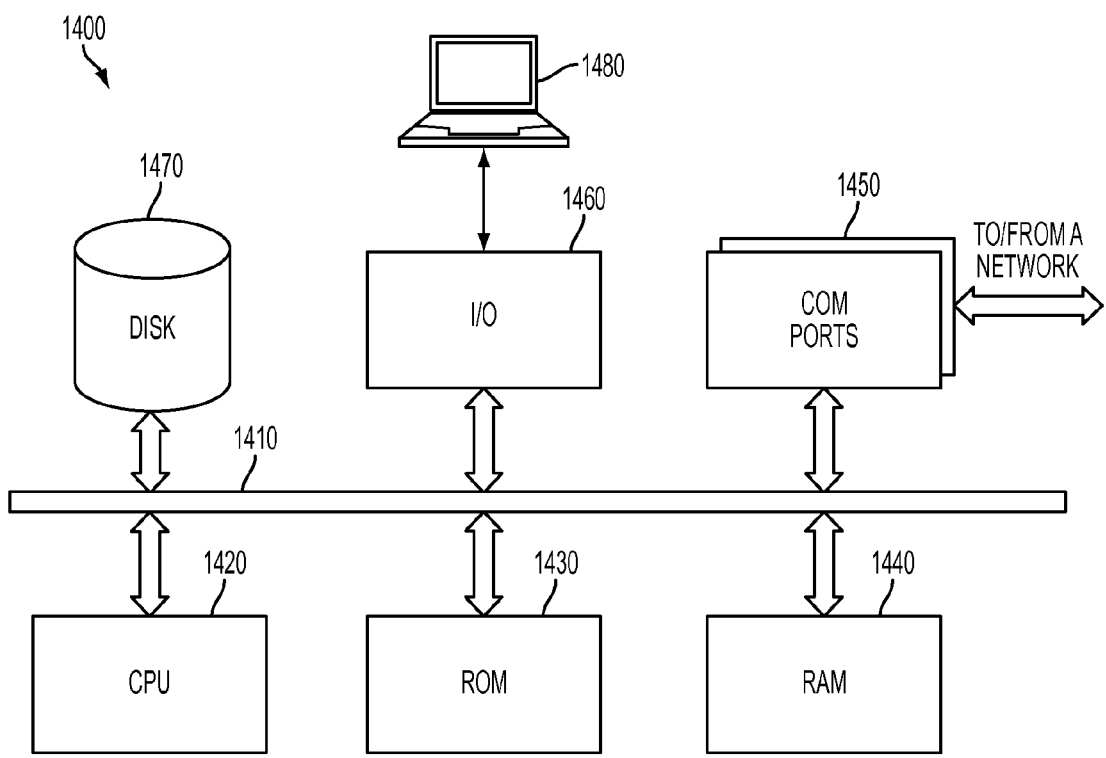
FIG. 4 depicts a general computer architecture on which the present disclosure can be implemented.

FIG. 4 provides a functional block diagram illustration of a computer hardware platform which includes user interface elements. The computer may be a general purpose computer or a special purpose computer. This computer 1400 can be used to perform the calculations as described herein, and implement any components of the graphical user interface as described herein. For example, the software tools for generating the steering level indicator, thrust angle indicator, and left and right front toe indicators can all be implemented on a computer such as computer 1400, via its hardware, software program, firmware, or a combination thereof. Although only one such computer is shown, for convenience, the computer functions relating to processing of the disclosed calculations and user interface may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of making the disclosed calculations and generating the disclosed graphical user interface, e.g., calculation of steering wheel level change and display of steering wheel level, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on a PC or server. In addition, the user interface and its components as disclosed herein can be implemented as a firmware, firmware/software combination, firmware/hardware combination, or a hardware/firmware/software combination.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for aligning the wheels of a vehicle equipped with an electro-mechanical power steering system having a steering angle sensor, a torque sensor, and a torsion bar linking the steering angle sensor and the torque sensor, the method comprising:
    moving a steering wheel of the vehicle to a level position such that there is substantially no torque applied to the torsion bar;
    adjusting the toe of a first one of the front wheels of the vehicle after the steering wheel is moved to the level position;
    aligning the rear wheels of the vehicle prior to adjusting the toe of the first one of the front wheels;
    calculating the thrust angle of the rear wheels;
    measuring the toe angles of each of the front wheels;
    determining whether the steering wheel has moved more than the predetermined angle based on each of the front wheel toe angles relative to the thrust angle; and
    moving the steering wheel substantially back to the level position, then re-adjusting the toe of the first one of the front wheels, when the steering wheel has moved more than a predetermined angle from the level position while adjusting the toe of the first one of the front wheels.

2. The method of claim 1, comprising:
    adjusting the toe of a second one of the front wheels when the steering wheel has moved less than the predetermined angle from the level position while adjusting the toe of the first one of the front wheels; and
    moving the steering wheel substantially back to the level position, then re-adjusting the toe of the second one of the front wheels, when the steering wheel has moved more than the predetermined angle from the level position while adjusting the toe of the second one of the front wheels.

3. The method of claim 1, comprising adjusting at least one of caster and camber of each of the front wheels after aligning the rear wheels and prior to adjusting the toe of the first one of the front wheels.

4. The method of claim 1, comprising determining the vehicle is equipped with an electro-mechanical power steering system prior to moving the steering wheel to the level position.

5. The method of claim 1, wherein resetting the steering wheel substantially back to the level position comprises turning one of the front wheels.

6. The method of claim 1, wherein the electro-mechanical power steering system has an electronic control unit in communication with the steering angle sensor and the torque sensor, the method comprising activating the electronic control unit prior to adjusting the toe of the first of the front wheels.

7. The method of claim 1, wherein the vehicle has an electronic control unit for controlling a suspension component of the vehicle, the method comprising:

placing the vehicle on an alignment rack having a locking turntable under each of the rear wheels prior to alignment the rear wheels of the vehicle;

performing a roll back procedure;

unlocking the turntables under the rear wheels after performing the roll back procedure; and starting the engine of the vehicle to reset the electronic control unit after unlocking the turntables.

8. An apparatus for aligning the wheels of a vehicle equipped with an electro-mechanical power steering system, the apparatus comprising:

measuring devices for determining toe angles for each of the front and rear wheels of the vehicle; and a data processor coupled to the measuring devices and having a set of instructions that, when executed, cause the data processor to perform the steps of:

calculating a thrust angle of the rear wheels based on the toe angles of the rear wheels received from the measuring devices;

prompting a technician to move a steering wheel of the vehicle to a level position without locking the steering wheel;

establishing the level position of the steering wheel based on each of the front wheel toe angles, received from the measuring devices, relative to the thrust angle;

prompting a technician to adjust the toe of a first one of the front wheels of the vehicle;

determining whether the steering wheel has moved more than a predetermined angle from the level position while adjusting the toe of the first one of the front wheels based on a change in the toe angle of a second one of the front wheels;

prompting the technician to move the steering wheel substantially back to the level position, then re-adjust the toe of the first one of the front wheels, when the steering wheel has moved more than the predetermined angle from the level position while adjusting the toe of the first one of the front wheels; and determining whether the steering wheel has moved more than the predetermined angle from the level position while re-adjusting the toe of the first one of the front wheels based on a change in the toe angle of the second one of the front wheels.

9. The apparatus of claim 8, wherein the set of instructions is for causing the data processor to perform the steps of:

prompting the technician to adjust the toe of the second one of the front wheels when the steering wheel has moved less than the predetermined angle from the level position while re-adjusting the toe of the first one of the front wheels;

determining whether the steering wheel has moved more than a predetermined angle from the level position while adjusting the toe of the second one of the front wheels based on a change in the toe angle of the first one of the front wheels; and prompting the technician to move the steering wheel substantially back to the level position, then re-adjust the toe of the second one of the front wheels, when the steering wheel has moved more than the predetermined angle from the level position while adjusting the toe of the second one of the front wheels.

10. The apparatus of claim 9, comprising a display device for indicating the steering wheel level and toe angles of each of the front wheels, for guiding the technician when aligning the front wheels and leveling the steering wheel.

11. The apparatus of claim 10, wherein the display device is for displaying the thrust angle such that the technician can discern if the thrust angle changes during wheel alignment.

12. The apparatus of claim 11, wherein the data processor is for causing the display device to graphically display the steering wheel level, toe angles of each of the front wheels, and thrust angle.

13. The apparatus of claim 8, wherein the data processor is for prompting the technician to reset the steering wheel substantially back to the level position by turning one of the front wheels.

14. The apparatus of claim 8, wherein the electro-mechanical power steering system has an electronic control unit, and the data processor is for prompting the technician to activate the electronic control unit prior to adjusting the toe of the first of the front wheels.

* * * * *